United States Patent
Grigg et al.

(10) Patent No.: US 9,830,590 B2
(45) Date of Patent: Nov. 28, 2017

(54) MOBILE WALLET PAYMENT VEHICLE PREFERENCES

(71) Applicant: Bank of America Corporation, Charlotte, NC (US)

(72) Inventors: David M. Grigg, Rock Hill, SC (US); Marc B. Keller, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 445 days.

(21) Appl. No.: 14/552,694

(22) Filed: Nov. 25, 2014

(65) Prior Publication Data

US 2015/0081540 A1  Mar. 19, 2015

Related U.S. Application Data

(63) Continuation of application No. 13/017,997, filed on Jan. 31, 2011, now abandoned.

(51) Int. Cl.

| | |
|---|---|
| *G06Q 40/00* | (2012.01) |
| *G06Q 20/36* | (2012.01) |
| *G06Q 20/20* | (2012.01) |
| *G06Q 20/32* | (2012.01) |
| *G06Q 20/34* | (2012.01) |
| *G06Q 20/40* | (2012.01) |
| *G06Q 30/02* | (2012.01) |
| *G06Q 40/06* | (2012.01) |

(Continued)

(52) U.S. Cl.
CPC .............. *G06Q 20/36* (2013.01); *G06Q 20/20* (2013.01); *G06Q 20/322* (2013.01); *G06Q 20/3227* (2013.01); *G06Q 20/3278* (2013.01); *G06Q 20/3572* (2013.01); *G06Q 20/363* (2013.01); *G06Q 20/405* (2013.01); *G06Q 30/0207* (2013.01); *G06Q 40/06* (2013.01); *H04L 67/306* (2013.01); *H04W 4/008* (2013.01)

(58) Field of Classification Search
USPC ..... 705/37, 39, 38, 40, 41, 7.29, 16, 44, 31, 705/17, 66, 45, 78; 382/100; 370/352; 726/29, 2, 26; 713/182; 235/375, 380, 235/379, 382, 435, 487, 439
See application file for complete search history.

(56) References Cited

U.S. PATENT DOCUMENTS 8,606,720 B1 * 12/2013 Baker ................... G06Q 20/00
                                                                  705/64
8,639,214 B1   1/2014 Fujisaki
(Continued)

OTHER PUBLICATIONS

Definition of "prompt" from Techweb dated Oct. 20, 2012.
Definition of "prompt" from Access Science dated Oct. 20, 2012.

*Primary Examiner* — Tien Nguyen
(74) *Attorney, Agent, or Firm* — Michael A. Springs; Moore & Van Allen PLLC; Peter B. Stewart

(57) ABSTRACT

In general, apparatuses, methods and computer program products for making contactless financial transactions utilizing a mobile wallet are disclosed. Particularly, a mobile wallet application is disclosed that utilizes, at least in part, user specific data to generate a payment vehicle recommendation for different transactions. The user specific data may include the active user profile, prior payment vehicle usage, user preferences for the type of transaction, user location, rewards programs associated with use of one or more payment vehicles, or the like, or combinations thereof.

17 Claims, 7 Drawing Sheets

(51) Int. Cl.
*H04W 4/00* (2009.01)
*H04L 29/08* (2006.01)

(56) References Cited

U.S. PATENT DOCUMENTS

| | | | | |
|---|---|---|---|---|
| 8,805,725 B2 * | 8/2014 | Calman | G06Q 30/06 | 705/16 |
| 8,827,154 B2 * | 9/2014 | Hammad | G06F 21/31 | 235/380 |
| 8,869,306 B2 * | 10/2014 | Kelley | G06F 17/30424 | 705/51 |
| 9,092,767 B1 * | 7/2015 | Andrews | G06Q 20/227 | |
| 9,424,413 B2 * | 8/2016 | Hammad | G06Q 20/00 | |
| 2001/0034720 A1 * | 10/2001 | Armes | G06Q 10/04 | 705/65 |
| 2002/0152163 A1 * | 10/2002 | Bezos | G06Q 20/02 | 705/39 |
| 2004/0104268 A1 * | 6/2004 | Bailey | G06Q 20/32 | 235/439 |
| 2004/0117302 A1 * | 6/2004 | Weichert | G06Q 20/102 | 705/40 |
| 2006/0165060 A1 * | 7/2006 | Dua | G06Q 20/20 | 370/352 |
| 2007/0162387 A1 * | 7/2007 | Cataline | G06Q 20/10 | 705/40 |
| 2007/0284443 A1 * | 12/2007 | Anson | G06K 7/0008 | 235/435 |
| 2008/0208742 A1 | 8/2008 | Arthur et al. | | |
| 2008/0270301 A1 * | 10/2008 | Jones | G06Q 20/02 | 705/41 |
| 2009/0018955 A1 * | 1/2009 | Chen | G06Q 20/10 | 705/39 |
| 2009/0043644 A1 * | 2/2009 | Wilkman | G06Q 30/02 | 705/7.29 |
| 2009/0119204 A1 * | 5/2009 | Akella | G06Q 20/10 | 705/39 |
| 2009/0192904 A1 * | 7/2009 | Patterson | G06Q 20/20 | 705/17 |
| 2009/0265241 A1 * | 10/2009 | Bishop | G06Q 20/02 | 705/14.38 |
| 2010/0008535 A1 * | 1/2010 | Abulafia | G06K 9/2054 | 382/100 |
| 2010/0125495 A1 | 5/2010 | Smith et al. | | |
| 2010/0125510 A1 | 5/2010 | Smith et al. | | |
| 2010/0268629 A1 * | 10/2010 | Ross | G06Q 10/10 | 705/35 |
| 2011/0153437 A1 * | 6/2011 | Archer | G06Q 20/10 | 705/17 |
| 2012/0078735 A1 * | 3/2012 | Bauer | G06Q 20/20 | 705/16 |
| 2012/0095852 A1 * | 4/2012 | Bauer | G06Q 20/105 | 705/16 |
| 2012/0136780 A1 * | 5/2012 | El-Awady | G06Q 20/102 | 705/40 |
| 2012/0143772 A1 * | 6/2012 | Abadir | G06Q 20/085 | 705/75 |
| 2012/0150601 A1 | 6/2012 | Fisher | | |
| 2012/0158528 A1 | 6/2012 | Hsu et al. | | |
| 2012/0197740 A1 * | 8/2012 | Grigg | G06Q 20/20 | 705/16 |
| 2013/0024364 A1 | 1/2013 | Shrivastava et al. | | |
| 2013/0346222 A1 * | 12/2013 | Ran | G06Q 20/20 | 705/17 |
| 2014/0006259 A1 * | 1/2014 | Grigg | G06Q 10/10 | 705/39 |
| 2014/0006272 A1 * | 1/2014 | Calman | G06Q 30/06 | 705/40 |
| 2014/0095385 A1 * | 4/2014 | Ainslie | G06Q 20/40 | 705/44 |
| 2015/0066742 A1 * | 3/2015 | Chatterton | G06Q 20/322 | 705/39 |

\* cited by examiner

| Payment Vehicle 410 | Payment Vehicle Number 420 | Name Associated with Payment Vehicle 430 | Expiration Date 440 | Credit/ Debit 450 | Payment Vehicle Recommendation 460 |
|---|---|---|---|---|---|
| CREDIT CARD 1 | ******** | YYYY | 05/15 | Credit | O |
| CREDIT CARD 2 | ******** | YYYY | 06/16 | Debit | O |
| CREDIT CARD 3 | ******** | YYYY | 07/19 | Credit | O |
| CREDIT CARD 4 | ******** | YYYY | 09/17 | Credit | ⊙ |
| CREDIT CARD 1 | ******** | XXXX | 12/17 | Credit | O |
| Gift Card 1 | ******** | N/A | N/A | Debit | O |
| Gift Card 2 | ******** | N/A | N/A | Debit | O |

FIG. 4

MOBILE WALLET PAYMENT VEHICLE PREFERENCES

CROSS-REFERENCE TO RELATED APPLICATIONS

This application is filed under the provisions of 35 U.S.C. §120 and is a continuation of U.S. patent application Ser. No. 13/017,997, filed Jan. 31, 2011, and entitled "Mobile Wallet Payment Vehicle Preferences" in the name of David M. Grigg, which is assigned to the assignee hereof and hereby expressly incorporated by reference herein.

BACKGROUND

In today's "digital age," more and more processes are becoming digital or automated. This is especially true in the financial industry. Over the years, primary methods for payment have evolved from cash to checks to credit and debit cards. More recently, technology has become available that permits for "contactless" transactions. For instance, a contactless payment is a payment where a customer pays a purchase amount without handing a payment card or a payment device to a cashier at the point-of-sale (POS) and without swiping the magnetic stripe of a payment card through a payment terminal (also sometimes referred to as a POS terminal). In other words, a contactless payment is one made using a payment device that may wirelessly transmit payment information to the payment terminal. Although physical contact between the payment device and the payment terminal may still occur in a contactless payment environment, physical contact between the payment device and the payment terminal is not necessary for transmission of the payment information from the payment device to the payment terminal.

Many payment terminals have the ability to read and process electronic payment information such as credit card or debit card information received wirelessly from a mobile device (e.g., a cell phone or other handheld computer) that is brought close to the payment terminal. Mobile devices configured with contactless transaction technology are often referred to as "mobile wallets" or "electronic wallets."

A mobile device having mobile wallet capabilities may allow a user to use the mobile device's interface to select a payment vehicle that the user wishes to use for paying a purchase amount. Subsequently, the mobile device may transmit payment information associated with the selected payment vehicle when the mobile device is brought close to the payment terminal. A payment vehicle may be any payment instrument such as a credit account, debit account, bank card, or other instrument that can be used by one entity to pay another entity.

Furthermore, in today's age, users have many more "accounts" than in years past. Due to various reasons, such as numerous incentive-laden reward accounts, various "store" credit accounts that offer benefits to account holders, and simply the higher rate of debt in today's society, users may have numerous payment vehicles available to them for a given transaction.

With the increasing number of accounts held by users, problems begin to arise in properly categorizing, sorting, and maintaining the payment vehicles associated with the accounts within a single mobile device. Oftentimes, users desire to use different payment vehicles for numerous types of transactions. For example, a user may desire to use one payment vehicle for automobile fuel to accurately track fuel costs through the year while the user may opt to utilize an entirely different payment vehicle for grocery expenditures because, for example, the particular payment vehicle offers increased rewards programs incentives for such purchases. Unfortunately, frequent utilization of numerous payment vehicles requires the user to repeatedly change the "default" payment vehicle. Furthermore, this practice may lead to confusion problems where the user mistakenly makes a transaction utilizing the wrong payment vehicle.

Thus, a need presently exists to produce a product capable of better managing a mobile wallet such that the desired payment vehicle is recommended or automatically set to be the default payment vehicle for different types of transactions.

SUMMARY

The following presents a simplified summary of several embodiments of the invention in order to provide a basic understanding of such embodiments. This summary is not an extensive overview of all contemplated embodiments of the invention, and is intended to neither identify key or critical elements of all embodiments, nor delineate the scope of any or all embodiments. Its purpose is to present some concepts of one or more embodiments in a simplified form as a prelude to the more detailed description that is presented later.

Embodiments of the present invention address the above needs and/or achieve other advantages by providing an apparatus (e.g., a system, computer program product, and/or other device), method, or a combination of the foregoing for making a financial transaction via a mobile device. Particularly, embodiments of the present invention are directed to providing the user with a recommendation or automatically updating the "default" payment vehicle to the desired payment vehicle for different types of transactions.

In a first embodiment of the invention, an apparatus for making a financial transaction is provided. The apparatus includes a memory device, a user interface, a communication device, and a processing device operatively coupled to the memory device and the communication device. The processing device is configured to execute computer-readable program code to display, via the user interface, a menu. The menu includes options selectable to the user that include multiple payment vehicles. The processing device is further configured to execute computer-readable program code to generate a payment vehicle recommendation. The recommendation generated is based, at least in part, on user specific data. Additionally, the processing device is further configured to execute computer-readable program code to present the generated payment vehicle recommendation to the user. Furthermore, the processing device is further configured to execute computer-readable program code to receive input instructions from the user to transmit payment vehicle data to an external apparatus. Finally, the processing device is further configured to execute computer-readable program code to transmit the payment vehicle data wirelessly to the external apparatus.

In specific embodiments, the apparatus is a mobile phone.

In some specific embodiments of the apparatus, the payment vehicle recommendation is presented to the user in the form of an automatically selected payment vehicle or an ordered list of payment vehicles arranged with the highest recommended payment vehicle presented first or at the top of the list.

In further specific embodiments of the apparatus, the payment vehicle recommendation is presented to the user in the form of a prompt to the user identifying the recommended payment vehicle and presenting information to the user relating to the reason the recommended payment vehicle was selected.

In particular specific embodiments of the apparatus, the user specific data includes the active user profile, prior payment vehicle usage, user preferences for the type of transaction, user location, rewards programs associated with use of one or more payment vehicles, or combinations thereof.

In some specific embodiments of the apparatus, the user specific data includes the active user profile. In some embodiments, the apparatus includes more than one user profile and the generated payment vehicle recommendation may differ depending on the user. The recommendation generated based, at least in part, on the active user's user specific data. In some embodiments, the processing device is further configured to execute computer-readable program code to generate financial planning data specific to one or more user profiles. The financial planning data includes a spending summary over a user-defined time period.

In some specific embodiments of the apparatus, the user specific data includes prior payment vehicle usage. In some embodiments, the processing device is further configured to execute computer-readable program code to record user transaction data in the memory device for some or all transactions. The user transaction data may be utilized in the generation of payment vehicle recommendations for future transactions.

In specific embodiments of the apparatus, the user specific data includes user preferences for the type of transaction. In some embodiments, the processing device is further configured to execute computer-readable program code to receive preference input from the user. The preference input includes preferred payment vehicles for a plurality of types of transactions. In some embodiments, the types of transactions include grocery transactions, convenience/fuel transactions, restaurant transactions, or combinations thereof.

In a still further specific embodiment of the apparatus, the user specific data includes the user location. In some embodiments, the user location is determined by a global positioning system (GPS). In some embodiments, the processing device is further configured to execute computer-readable program code to record user location data in the memory device for some or all transactions. The user location data may be utilized in the generation of payment vehicle recommendations for future transactions. In some other embodiments, the user location is determined by wireless communication between the apparatus and an external device where the external device communicates user location data to the apparatus.

In some specific embodiments of the apparatus, the user specific data comprises rewards programs associated with use of one or more payment vehicles.

Additionally, in some specific embodiments of the apparatus, the external apparatus is a terminal configured for contactless transactions.

In still further specific embodiments, the apparatus is configured to be capable of near field communication (NFC).

Furthermore, in specific embodiments of the apparatus, the external apparatus is a contactless payment terminal.

In another aspect of the invention, a method for making a financial transaction is provided. The method includes executing, on a mobile device that includes a memory device, a user interface, a communication device, and a processing device, a mobile wallet application. The mobile wallet application includes a menu of options selectable to a user. The options include multiple payment vehicles. The method further includes generating a payment vehicle recommendation. The recommendation generated is based, at least in part, on user specific data. Finally, the method includes transmitting payment vehicle data wirelessly to an external apparatus.

In some specific embodiments of the method, the mobile device is a mobile phone.

Additionally, in specific embodiments of the method, the payment vehicle recommendation is presented to the user, via the user interface, in the form of an automatically selected payment vehicle or an ordered list of payment vehicles arranged with the highest recommended payment vehicle presented first or at the top of the list.

In specific embodiments of the method, the payment vehicle recommendation is presented to the user, via the user interface, in the form of a prompt to the user identifying the recommended payment vehicle and presenting information to the user relating to the reason the recommended payment vehicle was selected.

In some particular specific embodiments of the method, the user specific data includes the active user profile, prior payment vehicle usage, user preferences for the type of transaction, user location, rewards programs associated with use of one or more payment vehicles, or combinations thereof.

In specific embodiments of the method, the user specific data comprises the active user profile. In some embodiments, the mobile device comprises more than one user profile and the generated payment vehicle recommendation may differ depending on the user. The recommendation generated is based, at least in part, on the active user's user specific data. In some further specific embodiments, the method further includes generating financial planning data specific to one or more user profiles. The financial planning data includes a spending summary over a user-defined time period.

In still further specific embodiments of the method of the method, the user specific data includes prior payment vehicle usage. In some embodiments, the method further includes recording user transaction data in the memory device for some or all transactions. The user transaction data may be utilized in the generation of payment vehicle recommendations for future transactions.

In some specific embodiments of the method, the user specific data comprises user preferences for the type of transaction. In some embodiments, the method further includes inputting user preference information into the mobile device. The user preference information includes preferred payment vehicles for a plurality of types of transactions. In some embodiments, the types of transactions include grocery transactions, convenience/fuel transactions, restaurant transactions, or combinations thereof.

Additionally, in further specific embodiments of the method, the user specific data includes the user location. In some embodiments, the user location is determined by a global positioning system (GPS). In further embodiments, the method additionally includes recording user location data in the memory device for some or all transactions. The user location data may be utilized in the generation of payment vehicle recommendations for future transactions. In other embodiments, the user location may be determined by wireless communication between the mobile device and an external device where the external device communicates user location data to the mobile device.

In still further specific embodiments of the method, the user specific data includes rewards programs associated with use of one or more payment vehicles.

Additionally, in some specific embodiments of the method, the external apparatus is a terminal configured for contactless transactions.

In still further specific embodiments, the method is configured to be capable of near field communication (NFC).

Furthermore, in specific embodiments of the method, the external apparatus is a contactless payment terminal.

In a still further aspect of the present invention, a computer program product for making a financial transaction via a mobile device is provided. The computer program product includes a non-transitory computer-readable medium. The medium includes a first set of code for executing, on a mobile device, a mobile wallet application configured to present a menu of options selectable to a user. The options include multiple payment vehicles. The medium further includes a second set of code for generating a payment vehicle recommendation. The recommendation is generated based, at least in part, on user specific data. Additionally, the computer-readable medium includes a third set of code for presenting the generated payment vehicle recommendation to the user. Finally, the medium includes a fourth set of code for transmitting payment vehicle data wirelessly from the mobile device to an external apparatus.

In specific embodiments of the computer program product, the mobile device is a mobile phone.

In further specific embodiments of the computer program product, the third set of code is configured to present the payment vehicle recommendation to the user in the form of an automatically selected payment vehicle or an ordered list of payment vehicles arranged with the highest recommended payment vehicle presented first or at the top of the list.

Additionally, in some embodiments of the computer program product, the third set of code is configured to present the payment vehicle recommendation to the user in the form of a prompt to the user identifying the recommended payment vehicle and presenting information to the user relating to the reason the recommended payment vehicle was selected.

In some particular embodiments of the computer program product, the user specific data includes the active user profile, prior payment vehicle usage, user preferences for the type of transaction, user location, rewards programs associated with use of one or more payment vehicles, or combinations thereof.

In still further specific embodiments of the computer program product, the user specific data includes the active user profile. In some embodiments, the second set of code is configured to generate the payment vehicle recommendation for more than one user profile within the mobile device where the payment vehicle recommendation may differ depending on the user profile. The recommendation generated may be based, at least in part, on the active user's user specific data. In some further embodiments, the computer-readable medium further includes a fifth set of code for generating financial planning data specific to one or more user profiles. The financial planning data includes a spending summary over a user-defined time period.

Furthermore, in some specific embodiments of the computer program product, the user specific data includes prior payment vehicle usage. In some embodiments, the computer-readable medium further includes a sixth set of code for recording user transaction data in a memory device for some or all transactions. The user transaction data may be utilized in the generation of payment vehicle recommendations for future transactions.

Moreover, in some specific embodiments, the user specific data comprises user preferences for the type of transaction. In some embodiments, the computer-readable medium further includes a seventh set of code for receiving user preference input. The user preference input includes preferred payment vehicles for a plurality of types of transactions. In some embodiments, the types of transactions comprise grocery transactions, convenience/fuel transactions, restaurant transactions, or combinations thereof.

In specific embodiments, the user specific data comprises the user location. In some embodiments, the user location is determined by a global positioning system (GPS). In some further embodiments, the computer-readable medium further includes an eighth set of code for recording user location data in a memory device for some or all transactions. The user location data may be utilized in the generation of payment vehicle recommendations for future transactions. In other embodiments, the user location is determined by wireless communication between the mobile device and an external device. The external device communicates user location data to the mobile device.

In still further specific embodiments of the computer program product, the user specific data includes rewards programs associated with use of one or more payment vehicles.

Additionally, in some specific embodiments of the computer program product, the external apparatus is a terminal configured for contactless transactions.

In further specific embodiments, the computer program product is configured to be capable of near field communication (NFC).

Furthermore, in specific embodiments of the computer program product, the external apparatus is a contactless payment terminal.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 4 illustrates a mobile wallet application menu, in accordance with an embodiment of the invention;

DETAILED DESCRIPTION OF EMBODIMENTS OF THE INVENTION

Figure 1:
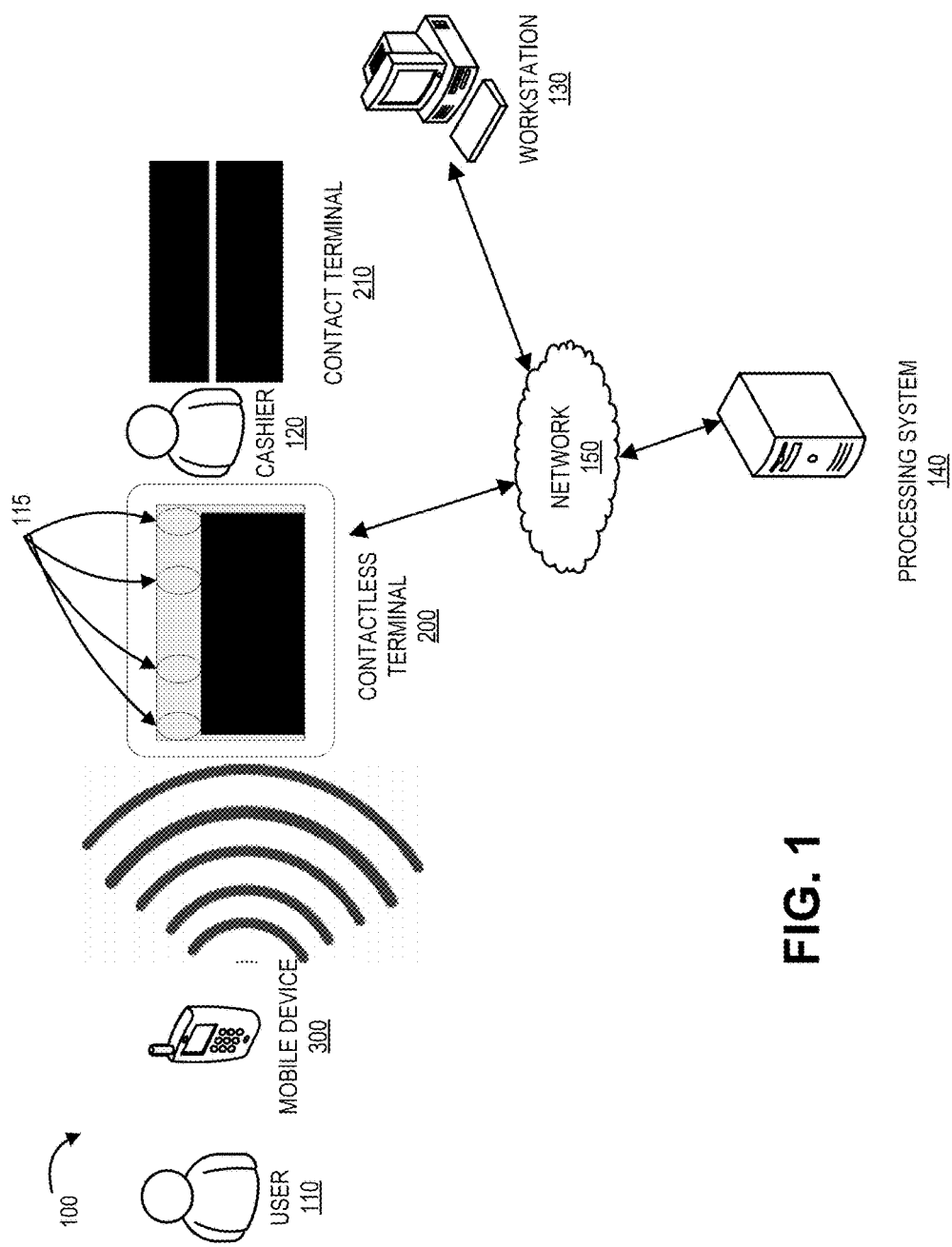
FIG. 1 illustrates a block diagram illustrating a contactless payment environment, in accordance with an embodiment of the invention.

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In accordance with embodiments of the invention, the term "entity" may refer to a seller, merchant, or the like, that offers contactless payment as a method of paying for a purchase associated with the entity. In accordance with embodiments of the invention, the term "user" may refer to a customer or the like, who makes a payment at a payment terminal associated with an entity. In accordance with embodiments of the invention, the term "tapping" may refer to bringing a mobile device close to or within the proximity of a payment terminal so that information can be communicated wirelessly between the mobile device and the payment terminal using short range wireless transmission technology, such near-field communication (NFC) technology, radio-frequency (RF) technology, or the like. Tapping may include physically tapping the mobile device against an appropriate portion of the payment terminal or it may include only waving or holding the mobile device near an appropriate portion of the payment terminal without making physical contact with the payment terminal.

In accordance with embodiments of the invention, the term "payment vehicle" may refer to an electronic payment vehicle, such as an electronic credit or debit card. The payment vehicle may not be a "card" at all and may instead be account identifying information stored electronically in a mobile device, such as in a cell phone. In accordance with embodiments of the invention, the term "module" with respect to an apparatus may refer to a hardware component of the apparatus, a software component of the apparatus, or a component of the apparatus that comprises both hardware and software. In accordance with embodiments of the invention, the term "chip" may refer to an integrated circuit, a microprocessor, a system-on-a-chip, a microcontroller, or the like that may either be integrated into the mobile device or may be inserted and removed from the mobile device by a user. In accordance with embodiments of the invention, the phrase "mobile wallet" refers to the hardware and/or software in a mobile device that enables the mobile device to be used to make contactless payments at a payment terminal.

In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like. In accordance with embodiments of the invention, the term "application" or "mobile wallet application" refers to a mobile application or program or computer code for maintaining and organizing payment vehicles.

In general, embodiments of the present invention relate to apparatuses, methods and computer program products for making contactless financial transactions. More specifically, the present invention is directed to a mobile wallet application that utilizes, at least in part, user specific data to generate a payment vehicle recommendation for different transactions. The user specific data may include the active user profile, prior payment vehicle usage, user preferences for the type of transaction, user location, rewards programs associated with use of one or more payment vehicles, or the like, or combinations thereof.

As a general matter, oftentimes mobile wallet users have numerous payment vehicles. For various reasons, it is not always convenient to have one "default" payment vehicle. Many payment vehicles are linked to various rewards programs with incentives for using the payment vehicle for certain types of transactions. Users frequently wish to use a debit payment vehicle as opposed to a credit payment vehicle due to a lower price of goods/services purchased with cash/debit. Whatever the reason, as mentioned, it can be cumbersome and tedious to a mobile wallet user to frequently change their "default" payment vehicle to use a more desired payment vehicle for a particular transaction.

In recognition of the above, generally, the present invention provides a mobile wallet system that manages a user's various payment vehicles. The mobile wallet operates to "sense" the type of transaction forthcoming and to offer a payment vehicle recommendation/automatically update the "default" payment vehicle. The mobile wallet may utilize any number of factors in the recommendation such as the active profile of the user currently using the device, prior payment vehicle usage, received input from the user regarding preferences for different types of transactions, the user's location, rewards programs associated with use of one or more payment vehicles, etc.

The mobile wallet system of the present invention may be a "learning" system as well. The system may record user tendencies and utilize such tendencies in recommending a payment vehicle in a future transaction. The mobile wallet system of the present invention provides a user with an efficient system for contactless payment transactions.

Referring to FIG. 1, a block diagram illustrating a contactless transaction environment 100 configured for making a contactless transaction via a mobile device 300 is shown. As illustrated, the contactless transaction environment 100 may include a mobile device 300 operable by a user 110 who may be a customer who wants to make a contactless payment or other transaction via a mobile device 300. The contactless transaction environment 100 may also include a contactless terminal 200 that may be automated or may be operable by a cashier 120. The contactless terminal 200 may permit a user to make a contactless payment or transaction with a transaction device such as the mobile device 300.

The environment 100 may also include a contact terminal 210 that may permit a user to make a payment via a contact transaction device such as a payment card that has a magnetic stripe which may be swiped through the contact terminal 210.

The contactless transaction environment 100 may also include a workstation 130 and a processing system 140 that are in electronic communication with the contactless terminal 200 via a network 150, which may be the Internet, an intranet or the like. The user interface 115 situated on the contactless terminal may be any sort of device, such as light emitting diodes (LEDs) for indicating that payment has been received, invalid payment vehicle, exceeded credit limit, etc.

In FIG. 1, the network 150 may include a local area network (LAN), a wide area network (WAN), and/or a global area network (GAN). The network 150 may provide for wireline, wireless, or a combination of wireline and wireless communication between devices in the network. In some embodiments, the network 150 includes the Internet. In some embodiments, the network 150 may include a wireless telephone network.

Figure 2:
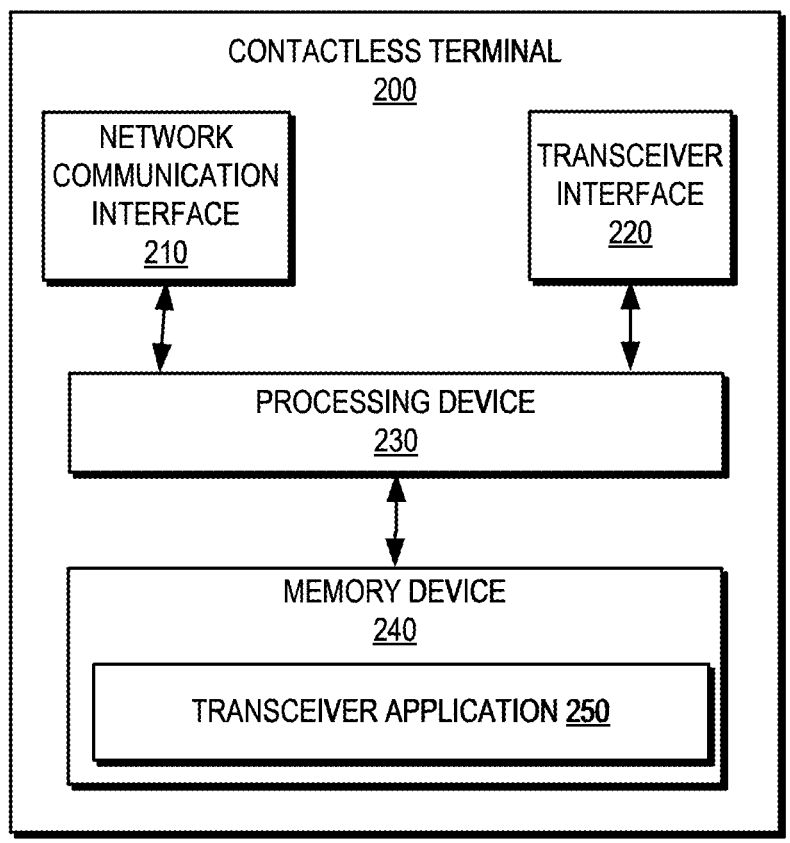
FIG. 2 illustrates a block diagram illustrating the payment terminal of FIG. 1, in accordance with an embodiment of the invention.

FIG. 2 displays an embodiment of a contactless terminal 200 that is depicted in FIG. 1. The contactless terminal 200 may include various features, such as a network communication interface 210, a processing device 230, a transceiver interface 220, and a memory device 240 that may include a transceiver application 250.

As used with respect to the contactless terminal 200, a "communication interface" may generally include a modem, server, transceiver, and/or other device for communicating with other devices on a network. The network communication interface may be a communication interface having one or more communication devices configured to communicate with one or more other devices in the contactless transaction environment 100, such as the mobile device 300, the workstation 130, the processing system 140, other processing systems, data systems, etc.

In one embodiment, the transceiver interface 220 is a separate module that may generally include a transceiver, i.e., one or more antennas and/or other electronic circuitry, devices, and software, for receiving electronic payment vehicle data when the mobile device is held close to or tapped at the contactless terminal 200. In some embodiments, the transceiver interface 220 is part of the network communication interface 210. Furthermore, the transceiver interface 220 may also be used as an interface to send data to the mobile device 300 when the mobile device 300 is held close to or tapped at the contactless terminal 200.

An output device for the transceiver interface 220 may include a display that provides instructions regarding the steps for making a contactless transaction. In some embodiments where the contactless terminal 200 requests the user's signature, the display may also serve as a touchpad input device to input the user's signature via a stylus. Other output devices may include one or more LEDs or an audio speaker, both which may indicate to the user that data has been successfully received from the mobile device 300. A printer that can print paper receipts may also be incorporated into the contactless terminal 200. Other embodiments of the contactless terminal 200 may carry other input and output devices, such as a mouse, keyboard, button, touchpad, touch screen, microphone, speaker, light, joystick, switch, or the like.

As used with respect to the contactless terminal 200, a "processing device," 230 may generally refer to a device or combination of devices having circuitry used for implementing the communication and/or logic functions of a particular system. For example, a processing device 230 may include a digital signal processor device, a microprocessor device, and various analog-to-digital converters, digital-to-analog converters, and other support circuits and/or combinations of the foregoing. Control and signal processing functions of the system may be allocated between these processing devices according to their respective capabilities. The processing device may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 230 may be configured to use the network communication interface 210 and/or the transceiver interface 220 to transmit and/or receive data and/or commands to and/or from the other devices that are visible in the contactless payment environment 100.

As used with respect to the contactless terminal 200, a "memory device" may generally refer to a device or combination of devices that store one or more forms of computer-readable media for storing data and/or computer-executable program code/instructions. For example, in one embodiment, the memory device may include any computer memory that provides an actual or virtual space to temporarily or permanently store data and/or commands provided to the processing device when it carries out its functions described herein. In one embodiment, the memory device stores a transceiver application 250. The transceiver application 250 may work in conjunction with the previously described transceiver interface 220 to receive electronic payment vehicle data when the mobile device is held close to or tapped at the contactless terminal 200. In some embodiments, the transceiver application 250 may also be configured to send data to the mobile device when the mobile device is held close to or tapped at the payment terminal, or potentially provide a power source to the mobile device in the event the primary power source is depleted.

As illustrated in FIG. 1, a contactless terminal 200 may be connected to a workstation 130 via the network 150. The workstation 130 may be used by the cashier 120 or other personnel to interact with the contactless terminal 200. The workstation 130 may include various features, such as a network communication interface, a processing device, a user interface, and a memory device.

As used with respect to the workstation 130, a "communication interface" may generally include a modem, server, transceiver, and/or other device for communicating with other devices on a network. The network communication interface may be a communication interface having one or more communication devices configured to communicate with one or more other devices on the network 150, such as the contactless terminal 200 and/or contact terminal 210, the processing system 140, other processing systems, data systems, etc.

As used with respect to the workstation 130, a "processing device" may generally refer to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system may be allocated between these processing devices according to their respective capabilities. The processing device may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device may be configured to use the network communication interface to transmit and/or receive data and/or commands to and/or from the other devices connected to the network 150.

As used with respect to the workstation 130, a "user interface" may generally include a plurality of interface devices and/or software that allow a user to input commands and data to direct the processing device to execute instructions. For example, the user interface may include a graphical user interface (GUI) or an interface to input computer-executable instructions that direct the processing device to carry out specific functions. The user interface may employ certain input and output devices to input data received from the user or the cashier 120 or output data to the user or the cashier 120. These input and output devices may include a display, mouse, keyboard, button, touchpad, touch screen, microphone, speaker, light, joystick, switch, and/or other customer input/output device for communicating with one or more customers. As used with respect to the workstation 130, a "memory device" may generally refer to a device or combination of devices that store one or more forms of computer-readable media for storing data and/or computer-executable program code/instructions. For example, in one embodiment, the memory device may include any computer memory that provides an actual or virtual space to temporarily or permanently store data and/or commands provided to the processing device when it carries out its functions described herein.

Figure 3:
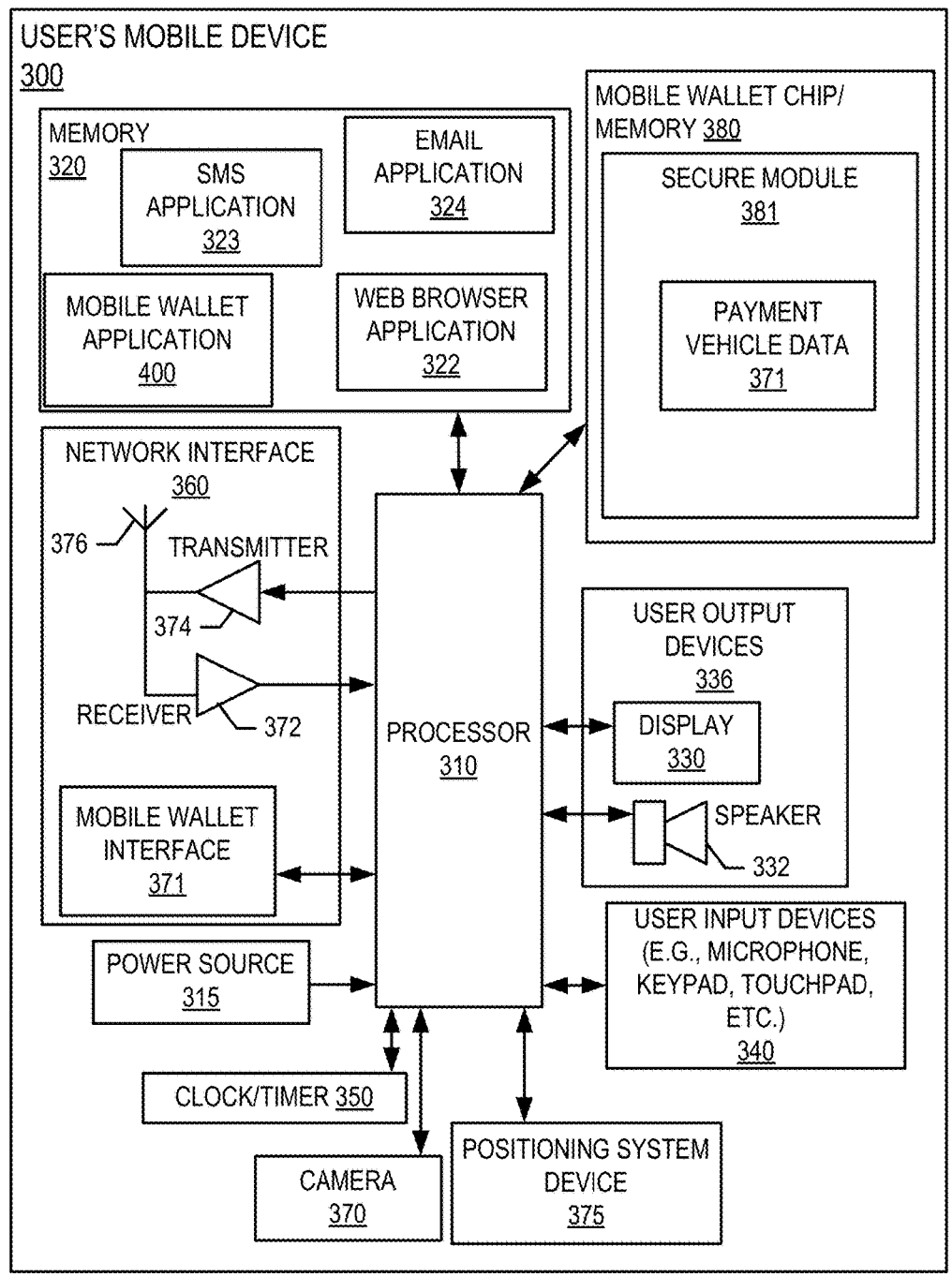
FIG. 3 illustrates a block diagram illustrating the mobile device of FIG. 1, in accordance with an embodiment of the invention.

Turning now to FIG. 3, illustrated is an embodiment of a mobile device 300 that may be configured to make a contactless transaction at a contactless terminal 200. As used herein, a "mobile device" 300 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like.

The mobile device 300 may generally include a processor 310 communicably coupled to such devices as a memory 320, user output devices 336, user input devices 340, a network interface 360, a power source 315, a clock or other timer 350, a camera 370, a positioning system device 375, one or more mobile wallet chips/memory 380, etc. The processor 310, and other processors described herein, may generally include circuitry for implementing communication and/or logic functions of the mobile device 300. For example, the processor 310 may include a digital signal processor device, a microprocessor device, and various analog to digital converters, digital to analog converters, and/or other support circuits. Control and signal processing functions of the mobile device 300 may be allocated between these devices according to their respective capabilities. The processor 310 thus may also include the functionality to encode and interleave messages and data prior to modulation and transmission. The processor 310 may additionally include an internal data modem. Further, the processor 310 may include functionality to operate one or more software programs, which may be stored in the memory 320. For example, the processor 310 may be capable of operating a connectivity program, such as a web browser application 322. The web browser application 322 may then allow the mobile device 300 to transmit and receive web content, such as, for example, location-based content and/or other web page content, according to a Wireless Application Protocol (WAP), Hypertext Transfer Protocol (HTTP), and/or the like.

The processor 310 may also be capable of operating a client application, such as a mobile wallet application 300. In one embodiment of the invention, the mobile wallet application 400 may be downloaded from a server and stored in the memory 320 of the mobile device 300. In another embodiment, the mobile wallet application 400 may be pre-installed and stored in a memory in the mobile wallet chip/memory 380. In such an embodiment, the user may not need to download the mobile wallet application 400 from a server. In some embodiments, the mobile wallet application 400 may have a graphical user interface (GUI) that allows the user to perform various processes as described below. The GUI may also allow the user to set certain payment preferences or mobile wallet preferences.

The mobile wallet chip/memory 380 includes a secure module 381 that may contain the payment vehicle data 371. The mobile wallet chip/memory 380 may be an integrated circuit, a microprocessor, a system-on-a-chip, a microcontroller, or the like. In one embodiment, the mobile wallet chip/memory 380 provides Near Field Communication (NFC) capabilities to the device 300.

Of note, while FIG. 3 illustrates the mobile wallet chip/memory 380 as a separate and distinct element within the mobile device 300, it will be apparent to those skilled in the art that the mobile wallet chip/memory 380 functionality may be incorporated within other elements in the mobile device 300. For instance, the functionality of the mobile wallet chip/memory 380 may be incorporated within the mobile device memory 320. In a particular embodiment, the functionality of the mobile wallet chip/memory 380 is incorporated in an element within the mobile device 300 that provides NFC capabilities to the mobile device 300. However, it is not necessary for the mobile wallet chip/memory 380 to provide the NFC capabilities to the mobile device 300. The mobile device 300 may include a NFC providing element (and/or other wireless communication systems) (not shown) separate from the mobile wallet chip/memory 380.

The secure module 381 may be a memory device within the mobile wallet chip/memory 380. The secure module 381 may comprise payment vehicle data 371 associated with a plurality of payment vehicles. The payment vehicle data 371 may be data typical of standard card-type payment vehicles. For instance, payment vehicle data 371 for each payment vehicle that is stored in the secure module 381 may include the payment vehicle type, the payment vehicle number, the name associated with the payment vehicle, the expiration date of the payment vehicle, the security code associated with the payment vehicle, whether the payment vehicle is a credit or debit payment vehicle, gift card payment vehicle, etc. Additionally, the secure module 381 may comprise data indicating whether a payment vehicle is a default payment vehicle. In the embodiment depicted in FIG. 3, since the secure module 381 is stored in a memory in the mobile wallet chip/memory 380 and not in a memory 320 in the mobile device 300, the user may be able to transfer the mobile wallet chip/memory 380, if the mobile wallet chip/memory 380 is not irreversibly integrated into the mobile device 300, to another mobile device and the user may consequently have access to the payment vehicles in the mobile wallet chip/memory 380 on a different mobile device. Alternatively, the secure module 381 could be stored in a secured sector of memory 320 or other data storage of the mobile device 300 and be transferred to a new mobile device 300. Furthermore, the mobile wallet application 400 and/or data within the secure modules may be additionally stored on an external apparatus or network to provide the user with the capability to readily transfer their mobile wallet system from one mobile device 300 to another or to restore their mobile wallet system to their device 300, if needed.

The processor 310 may be configured to use the network interface 360 to communicate with one or more other devices on the network 150. In this regard, the network interface 360 may include an antenna 376 operatively coupled to a transmitter 374 and a receiver 372 (together a "transceiver"). The processor 310 may be configured to provide signals to and receive signals from the transmitter 374 and receiver 372, respectively. These signals may include radio frequency signals emanating from the mobile device's transmitter 374 when the mobile device is tapped at or held or waved in close proximity to the contactless terminal 200. These signals may also include radio frequency signals received at the mobile device's receiver 372 when the mobile device is tapped at or held or waved in close proximity to the contactless terminal 200. In one embodiment, these radio frequency signals may be transmitted and received in the radio frequency band, such as 13.56 MHz. In one embodiment, the ISO/IEC 14443 standard may define the protocol associated with the data carried by these radio frequency signals. In one embodiment, the transmitter 374 and receiver 372 at the mobile device may transmit and receive radio frequency signals, respectively, from a payment terminal within a distance of up to 25 cm.

As indicated earlier, the processor 310 may be configured to provide signals to and receive signals from the transmitter 374 and receiver 372, respectively. The signals may also include signaling information in accordance with the air interface standard of the applicable cellular system of the wireless telephone network that may be part of the network 150. In this regard, the mobile device 300 may be configured to operate with one or more air interface standards, communication protocols, modulation types, and access types. By way of illustration, the mobile device 300 may be configured to operate in accordance with any of a number of first, second, third, and/or fourth-generation communication protocols and/or the like. For example, the mobile device 300 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 300 may also be configured to operate in accordance with non-cellular communication mechanisms, such as via a wireless local area network (WLAN) or other communication/data networks.

The network interface 360 may also include a mobile wallet interface 371 in order to allow a user to execute some or all of the above-described processes with respect to the mobile wallet application 400 and the secure module 381 of the mobile wallet chip/memory 380. The mobile wallet interface 371 may have access to the hardware, e.g., the transceiver, and software previously described with respect to the network interface 360.

The mobile device 300 may comprise a transceiver that works in conjunction with the secure module 381 of the mobile device 300. In one embodiment, the antenna and other hardware or software that transmit payment vehicle data from the secure module 381 of the mobile device 300 may be integrated into the secure module 381.

As described above, the mobile device 300 may have a user interface that includes user output devices 336 and/or user input devices 340. The user output devices 336 may include a display 330 (e.g., a liquid crystal display (LCD) or the like) and a speaker 332 or other audio device, which are operatively coupled to the processor 310. The user input devices 340, which may allow the mobile device 300 to receive data from a user 110, may include any of a number of devices allowing the mobile device 300 to receive data from a user, such as a keypad, keyboard, touch-screen, touchpad, microphone, mouse, joystick, other pointer device, button, soft key, and/or other input device(s).

The mobile device 300 may further include a power source 315. In one embodiment, a power source 315 is a device that supplies electrical energy to an electrical load. In one embodiment, a power source 315 may convert a form of energy such as solar energy, chemical energy, mechanical energy, etc. to electrical energy. In one embodiment, a power source 315 in a mobile device may be a battery, such as a lithium battery, a nickel-metal hydride battery, or the like, that is used for powering various circuits, e.g., the transceiver circuit, and other devices that are used to operate the mobile device 300. In some embodiments, the power source 315 may be a power adapter that can connect a power supply from a power outlet to the mobile device 300. In some embodiments, a power adapter may be classified as a power source "in" the mobile device.

The mobile device 300 may also include a memory 320 operatively coupled to the processor 310. As used herein, memory may include any computer readable medium (as defined herein below) configured to store data, code, or other information. The memory 320 may include volatile memory, such as volatile Random Access Memory (RAM) including a cache area for the temporary storage of data. The memory 320 may also include non-volatile memory, which can be embedded and/or may be removable. The non-volatile memory may additionally or alternatively include an electrically erasable programmable read-only memory (EEPROM), flash memory or the like.

The memory 320 may store any of a number of applications or programs which comprise computer-executable instructions/code executed by the processor 310 to implement the functions of the mobile device 300 described herein. For example, the memory 320 may include such applications as a web browser application 322 and a mobile wallet application 400. The mobile wallet application 400 may be capable of performing one or more functions described above. These applications may also typically provide a graphical user interface (GUI) on the display 330. For instance, as described previously, the GUI for the mobile wallet application 400 may allow the user 110 to enter input to select a payment vehicle or to transmit to a contactless terminal 200.

The memory 320 may also store any of a number of pieces of information, and data, used by the mobile device 300 and the applications and devices that make up the mobile device 300 or are in communication with the mobile device 300 to implement the functions of the mobile device 300 and/or the other systems described herein. For example, the memory 320 may include such data as user authentication information to gain access to the mobile wallet application 400, user authentication information for each payment vehicle that is stored by or accessible via the mobile wallet application 400, user authentication information to access the secure module 381 of the mobile wallet chip/memory 380, etc. In other embodiments, this authentication information may be stored in a memory of the mobile wallet chip 380.

Figure 5:
FIG. 5 illustrates a mobile wallet application menu, in accordance with an embodiment of the invention.
Figure 6:
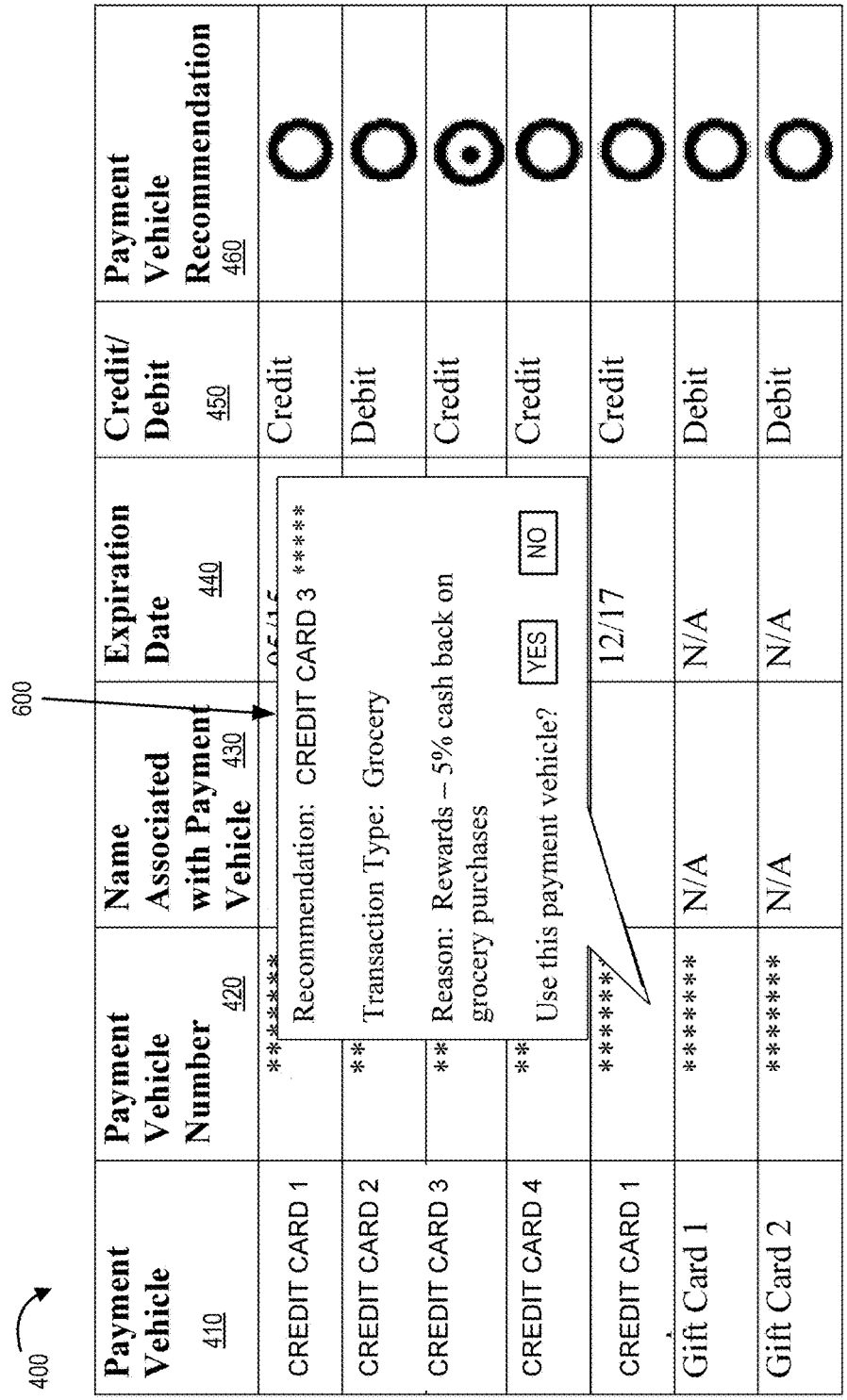
FIG. 6 illustrates a mobile wallet application menu, in accordance with an embodiment of the invention.

Referring to FIGS. 4-6, embodiments of the mobile wallet application 400 are illustrated. Importantly, the mobile wallet application 400 of the present invention is not limited to the embodiments shown in the figures. Indeed, the manner in which the "menu" of payment vehicles 410 is presented to the user is not critical to the present invention. Furthermore, the functionality of the mobile wallet system, as discussed further below, may be incorporated into other mobile wallet applications and systems. For instance, in one embodiment, the mobile wallet system of the present invention is incorporated into a mobile wallet experience.

FIG. 4 illustrates a display of one embodiment of the mobile wallet application 400. As illustrated, the display may include the payment vehicle 410, the unique payment vehicle account number 420 associated with the payment vehicle 410, the name associated with the payment vehicle 430, the payment vehicle's expiration date 440, whether the payment vehicle is credit or debit 450 and the payment vehicle recommendation 460 which may simply be an automated update of the "default" payment vehicle.

As shown in this embodiment, the payment vehicle recommendation 460 is the "Discover" payment vehicle 410 and is presented in the mobile wallet application 400 as the fourth payment vehicle 410 in the list. Thus, in this embodiment, the list of payment vehicles 410 may be arranged in any manner whether it be an alphabetical listing, a chronological listing based on when the payment vehicle 410 was added to the mobile wallet, user preference, etc., so long as the mobile wallet application 410 includes some sort of identifier for the automatically updated default payment vehicle/payment vehicle recommendation 460.

The mobile wallet application 400 may be configured to utilize any sort of user specific data to generate the payment vehicle recommendation 460. The user specific data may be any sort of metric that would be feasible to utilize in forming the recommendation. For example, the user specific data may include the active user profile (i.e. which user is currently utilizing the mobile device), prior payment vehicle usage, user preferences for the type of transaction, user location, or rewards programs associated with use of one or more payment vehicles. Furthermore, the application 400 may be a "learning" application in which recommendations may change as more user specific data is recorded. For example, if the application 400 recommends a payment vehicle for most fuel purchase transactions due primarily to a favorable rewards program associated with fuel purchases, but the user repeatedly opts not to use the recommended vehicle, the mobile wallet application 400 may cease to recommend the vehicle in favor of another vehicle or adjust the weight the recommendation relies upon rewards programs.

Regarding the active user profile, in some embodiments, the mobile device 300 includes the capability of incorporating multiple user profiles that tailor the mobile device experience to the user. Utilizing multiple profiles allows each user to access all of their desired user-specific information and applications such as email, web browsing preferences, background displays, sound levels, payment vehicles, etc., without being intermingled with other users' information and applications. Thus, the active user profile (i.e. the profile that is currently utilizing the mobile device 300) may weigh heavily on the payment vehicle recommendation 460 as one user may generally prefer to utilize one payment vehicle for a certain transaction while another user would prefer to use an entirely different payment vehicle. Furthermore, in some instances, one user may not be authorized to use a payment vehicle while another is.

Prior payment vehicle usage may also weigh heavily in generation of the payment vehicle recommendation 460. Prior payment vehicle usage may encompass any information associated with the payment vehicle's usage in one or more transactions in the past. For example, if a user visits a coffee shop every morning before work and uses a particular payment vehicle, the recommendation 460 may factor in the time of day of the transaction and recommend one payment vehicle 410 between the hours of 7 am and 8 am and recommend a different payment vehicle 410 during other hours. Furthermore, if the user uses a particular vehicle most often and other vehicles for only particular types of transactions, the recommended payment vehicle 410 may be the most commonly used payment vehicle 410 if the application 400 does not have any further user specific data that indicates that one of the other payment vehicles may be warranted. Thus, the application 400 may record any data associated with transactions and use the past transaction data in generating a payment vehicle recommendation 460.

User preferences may also be factored into the recommendation 460. For instance, the user may input into the application a preferred payment vehicle 410 for different types of transactions, for transactions made during a certain time period or certain dates, a general order of preference of the payment vehicles that may be utilized in conjunction with other user specific data to make a recommendation, etc. For example, the user may indicate that he may wish to utilize one payment vehicle 410 for "grocery" types of transactions, a second payment vehicle 410 for "convenience/fuel" types of transactions, and a third vehicle for "restaurant" type transactions. Thus, the payment vehicle recommendation 460 may factor user preferences accordingly.

User location may also be utilized in generating the recommendation 460. The mobile device may include capability to determine the general geographical area of the user's location such as, for example, the connection to a cellular phone tower, or even the near exact geographical position of the user, such as, for example, by utilizing a global positioning system (GPS). For example, a GPS may include "points of interest" data that may indicate the retail store, amusement park, fuel station, etc. that the user is presently located. Furthermore, in a "learning" aspect, the mobile wallet application 400 may record the user's geographic location and associate it with the actual place of business that the user transacts with. For instance, if the user utilizes their mobile wallet to make a transaction at "Retailer A," the mobile wallet application 400 may record the geographical location of the user (e.g., by utilizing a GPS) and the next time the user returns to the geographical location, recommend a payment vehicle 460 accordingly.

Additionally, the mobile device 300 may have the capability of determining the user's geographical location by wireless communication with an external device that communicates the location to the mobile device. The external device may be any device capable of wireless communication with the mobile device. For instance, the mobile device 300 may receive a wireless internet signal from a business's router and determine the user's location. In one embodiment, the mobile device 300 receives a wireless signal from security sensors, such as sensors generally placed at the entrance/exit of a place of business to detect sensors on merchandise. Furthermore, the external device may even be the contactless terminal 200 that produces a location indicating signal before the user actively attempts to communicate with the contactless terminal 200 to make a transaction.

The mobile wallet application 400 may factor rewards programs associated with payment vehicles into generating the recommendation 460 as well. For instance, if a payment vehicle includes some type of accumulation of "points," cash back rewards, frequent flyer benefits, or the like, the mobile wallet application 400 may factor the rewards into the recommendation 460. Details on rewards programs associated with the payment vehicles 410 may be obtained by user input or by communication with the financial institution associated with the payment vehicle 410.

As noted above, the payment vehicle recommendation 460 may be presented to the user in any manner. In one embodiment, as illustrated in FIG. 5, the payment vehicle recommendation 460 is presented as a list from "highest recommended" to "lowest recommended" with the highest recommended payment vehicle 410 positioned at the top of the list. As illustrated, the recommendation in FIG. 5 is the "American Express" payment vehicle 410 associated with "Jane Smith." In this example, for instance, the active user profile on the mobile device 400 is "Jane Smith" while the "John Smith" user profile is dormant. Thus, the active user profile may have weighed heavily in the generation of the recommendation 460. Of note, while FIG. 5 is described as a list from "highest recommended" to "lowest" recommended, it is not necessary that all payment vehicles 410 be "ranked." In one embodiment, the "highest recommended" payment vehicle 460 is placed at the top of the menu list while the remaining payment vehicles 410 are randomly placed on the list or organized according to a metric other than recommendation weight. In another embodiment, more than one, but not all, of the payment vehicles 410 are placed at the top of the menu list from highest to lowest recommended while other payment vehicles 410 are listed randomly or organized according to a different metric below the ranked payment vehicles 410. Such an embodiment may be beneficial if some payment vehicles are not recommended at all, for instance, if the account is reached a spending limit, the user is not authorized to use the account, the merchant does not accept the payment vehicle 410, etc.

FIG. 6 illustrates another embodiment for presenting the payment vehicle recommendation 460 to the user. As shown, in this embodiment, a prompt 600 is displayed to the user indicating the recommended payment vehicle 410. As illustrated, the recommendation 460 may include a brief summary of the primary reason the particular payment vehicle 410 was recommended. In this instance, the primary reason for the recommendation of the "Master Card" payment vehicle 410 was due to a rewards program associated with the payment vehicle 410 that offered 5% cash back on grocery purchases. Of note, it is not necessary for all "prompt" embodiments of the invention to include a reason for the recommendation. FIG. 6 further illustrates a "Yes" or "No" selection available to the user to allow the user to input whether or not they agree with the using recommended payment vehicle 410. Such a confirmation is not necessary to the prompt embodiment. For instance, the prompt may indicate what the recommendation 460 is and automatically select the recommendation as the default. If the user wishes to use a different payment vehicle 410, he would need to change the payment vehicle 410 to the desired vehicle.

Figure 7:
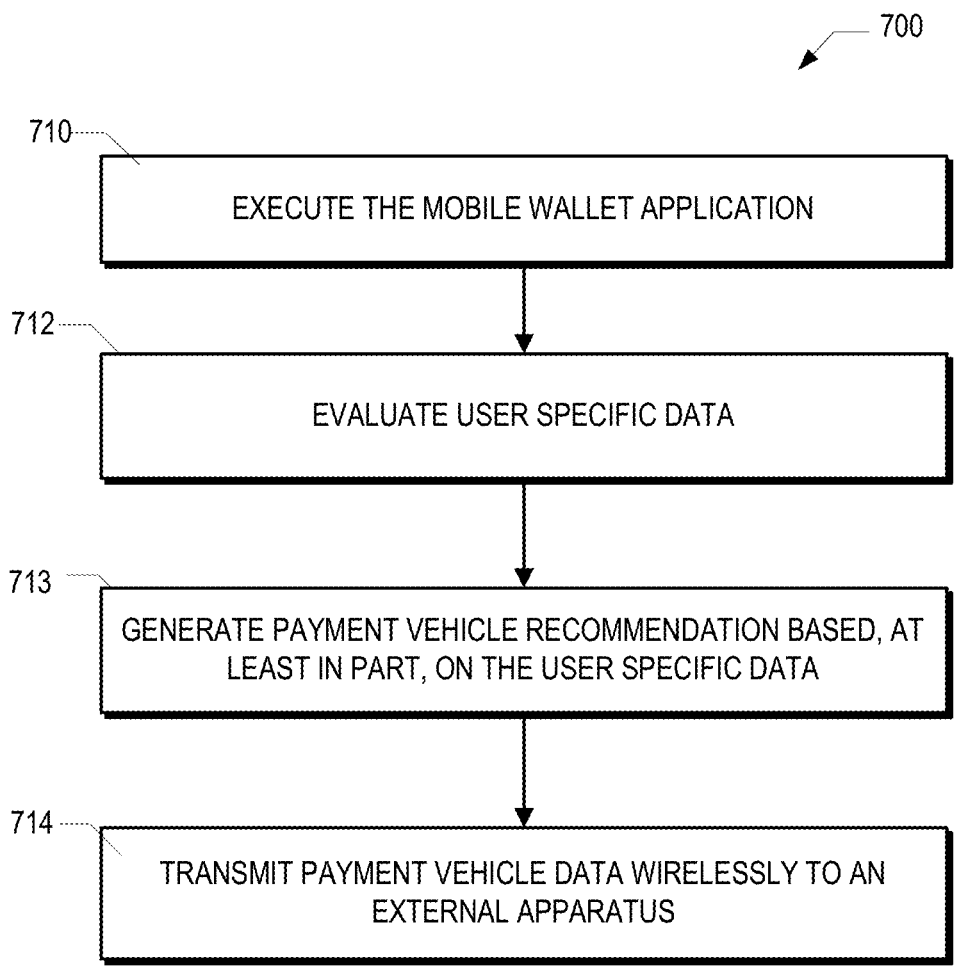
FIG. 7 is a high level flow diagram of a method for making a contactless financial transaction, in accordance with an embodiment of the present invention.

Referring now to FIG. 7, illustrated is a high level flow diagram of a method 700 for making a contactless financial transaction. At block 710, the mobile wallet application 400 is executed on the mobile device 300. Executing the mobile wallet application 400 may require some degree of user authentication. At block 712, the user specific data is evaluated. Again, user specific data may be any sort of metric that would be feasible to utilize in forming the recommendation. At block 713, the mobile wallet application 400 generates a payment vehicle recommendation 460 that is based, at least in part, on user specific data. The transaction is completed at block 714 where payment vehicle data is wirelessly transmitted to an external apparatus. The external apparatus may generally be a contactless transaction terminal such as a contactless payment terminal, an automated teller machine (ATM), or the like.

The mobile wallet application 400 is configured to help the user manage payment information stored on the mobile device 300 and help the user to communicate payment information to the payment terminal using the correct protocol or data format. The mobile wallet application 400, when executed by the processor of the mobile device 300, typically presents the user with a graphical user interface (GUI) that allows the user to select a payment vehicle 410 to use for a transaction from a plurality of payment vehicles stored in the mobile device 300, or in a mobile wallet chip 380 that may be integrated into the mobile device. The GUI may also allow the user to set certain payment preferences or mobile wallet preferences.

Thus, present embodiments of the invention disclosed in detail above provide systems, methods, and computer program products for making a financial transaction via a mobile device and providing a mobile wallet application to effectively and efficiently manage a mobile wallet with a plurality of payment vehicles. As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." For example, various embodiments may take the form of web-implemented computer software. Furthermore, embodiments of the present invention may take the form of a computer program product on a computer-readable medium having computer-executable program code embodied in the medium.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein above with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A mobile device associated with a user for making a purchase, the mobile device comprising:
    a memory device;
    a positioning system device;
    a user interface configured to present information to the user;
    a communication device;
    a memory chip comprising a secure module;
    a processing device operatively coupled to the memory device, the memory chip, and the communication device; and
    a mobile wallet application configured to:
        receive authentication information from the user to access the mobile wallet application;
        compare the authentication information received from the user with authentication data stored in the secure module;
        determine a match between the authentication information and the authentication data stored in the secure module and authorize access to the mobile wallet application;
        establish a wireless communication with an external device, wherein the external device is a merchant router or a merchant security sensor;
        receive a wireless signal from the external device and determine a location of the user making a current purchase using the positioning system device based on the wireless signal received from the external device;

determine an active user profile of the mobile device from a list of user profiles associated with the mobile device, wherein the active user profile associated with the user is currently utilizing the mobile wallet application to the exclusion of at least one dormant user profile associated with a second user;

present, via the user interface, a menu, the menu comprising options selectable by the user, the options comprising multiple payment vehicles;

generate a payment vehicle recommendation, the payment vehicle recommendation generated based, at least in part, on a history of prior payment vehicle usage associated with the active user profile to make a prior purchase at the location;

cause a user interface of the mobile device to display a selectable prompt comprising at least an identification of the payment vehicle recommendation;

receive, via the user interface of the mobile device, a user input of a selection of the selectable prompt comprising at least the identification of the payment vehicle recommendation;

receive, via the user interface of the mobile device, a second user input comprising instructions to transmit payment vehicle data of a recommended payment vehicle associated with the payment vehicle recommendation to an external apparatus, wherein the external apparatus is an automated teller machine or a contactless payment terminal; and transmit the payment vehicle data associated with the recommended payment vehicle wirelessly from the mobile device to the external apparatus to complete the current purchase.

2. The mobile device of claim 1, wherein the mobile wallet application is further configured to generate a spending summary over a user-defined time period for the active user profile.

3. The mobile device of claim 1, wherein the mobile wallet application is further configured to record user transaction data in the memory device for some or all transactions, the user transaction data being utilized in the generation of payment vehicle recommendations for future transactions.

4. The mobile device of claim 3, wherein the mobile wallet application is further configured to record user location data in the memory device for some or all transactions, the user location data being utilized in the generation of payment vehicle recommendations for future transactions.

5. The mobile device of claim 1, wherein the mobile wallet application is further configured to present, via the user interface, a primary reason for selecting the recommended payment vehicle.

6. The mobile device of claim 1, wherein the memory chip is removably stored in a secured data storage location that is separate from the memory device of the mobile device.

7. A method for making a purchase, the method comprising:

executing, on a mobile device comprising a memory device, a user interface, a communication device, and a processing device, a mobile wallet application, the mobile wallet application comprising a menu of options selectable by a user, the options comprising multiple payment vehicles, wherein executing the mobile wallet application comprises:

receiving authentication information from the user to access the mobile wallet application;

comparing the authentication information received from the user with authentication data stored in a secure module of a memory chip of the mobile device;

determining a match between the authentication information and the authentication data stored in the secure module and authorize access to the mobile wallet application;

establishing a wireless communication with an external device, wherein the external device is a merchant router or a merchant security sensor;

receiving a wireless signal from the external device and determining a location of the user making a current purchase using a positioning system device based on the wireless signal received from the external device;

determining an active user profile of the mobile device from a list of user profiles associated with the mobile device, wherein the active user profile is currently utilizing the mobile wallet application to the exclusion of at least one dormant user profile;

generating a payment vehicle recommendation, the payment vehicle recommendation generated based, at least in part, on a history of prior payment vehicle usage associated with the active user profile to make a prior purchase at the location;

causing a display of the mobile device to present, on the user interface of the mobile device, a selectable prompt comprising at least an identification of the payment vehicle recommendation;

receiving, via the user interface of the mobile device, a user input of a selection of the selectable prompt comprising at least the identification of the payment vehicle recommendation;

receiving, via the user interface of the mobile device, a second user input comprising instructions to transmit payment vehicle data of a recommended payment vehicle associated with the payment vehicle recommendation to an external apparatus, wherein the external apparatus is an automated teller machine or a contactless payment terminal; and transmitting the payment vehicle data associated with the recommended payment vehicle wirelessly from the mobile device to an external apparatus to complete the current purchase.

8. The method of claim 7, further comprising generating a spending summary over a user-defined time period for the active user profile.

9. The method of claim 7, further comprising recording user transaction data in the memory device for some or all transactions, the user transaction data being utilized in the generation of payment vehicle recommendations for future transactions.

10. The method of claim 7, wherein the mobile wallet application is further configured to present, via the user interface, a primary reason for selecting the recommended payment vehicle.

11. The method of claim 7, wherein the memory chip is removably stored in a secured data storage location that is separate from the memory device of the mobile device.

12. A computer program product for making a purchase via a mobile device, the computer program product comprising a non-transitory computer-readable medium comprising computer program code instructions for:

receiving authentication information from the user to access a mobile wallet application stored on the mobile device;

comparing the authentication information received from the user with authentication data stored in a secure module of a memory chip of the mobile device;

determining a match between the authentication information and the authentication data stored in the secure module and authorize access to the mobile wallet application;

establishing a wireless communication with an external device, wherein the external device is a merchant router or a merchant security sensor;

receiving a wireless signal from the external device and determining a location of the user making a current purchase using a positioning system device based on the wireless signal received from the external device;

determining an active user profile of the mobile device from a list of user profiles associated with the mobile device, wherein the active user profile is currently utilizing the mobile wallet application to the exclusion of at least one dormant user profile;

executing, on the mobile device, the mobile wallet application configured to present, on a user interface of the mobile device, a menu of options selectable by a user, the menu of options comprising multiple payment vehicles;

generating a payment vehicle recommendation, the payment vehicle recommendation being generated based, at least in part, on a history of prior payment vehicle usage associated with the active user profile to make a prior purchase at the location;

causing a display of the mobile device to present, on the user interface of the mobile device, a selectable prompt comprising at least an identification of the payment vehicle recommendation;

receiving, via the user interface of the mobile device, a user input of a selection of a the selectable prompt comprising at least the identification of the payment vehicle;

receiving, via the user interface of the mobile device, a second user input comprising instructions to transmit payment vehicle data of a recommended payment vehicle associated with the payment vehicle recommendation to an external apparatus, wherein the external apparatus is an automated teller machine or a contactless payment terminal; and transmitting the payment vehicle data associated with the recommended payment vehicle wirelessly from the mobile device to an external apparatus to complete the purchase.

13. The computer program product of claim 12, wherein the computer-readable medium further comprises computer program code instructions for generating a spending summary over a user-defined time period for the active user profile.

14. The computer program product of claim 12, wherein the computer-readable medium further comprises computer program code instructions for recording user transaction data in a memory device for some or all transactions, the user transaction data being utilized in the generation of payment vehicle recommendations for future transactions.

15. The computer program product of claim 12, wherein the computer-readable medium further comprises computer program code instructions for recording user location data in a memory device for some or all transactions, the user location data being utilized in the generation of payment vehicle recommendations for future transactions.

16. The computer program product of claim 12, wherein the mobile wallet application is further configured to present, via the user interface, a primary reason for selecting the recommended payment vehicle.

17. The computer program product of claim 12, wherein the memory chip is removably stored in a secured data storage location that is separate a memory device of the mobile device.

* * * * *